United States Patent [19]

Nahlovsky et al.

[11] Patent Number: 5,314,550
[45] Date of Patent: May 24, 1994

[54] RECOVERY OF ALUMINUM AND HYDROCARBON VALUES FROM COMPOSITE ENERGETIC COMPOSITIONS

[75] Inventors: Boris D. Nahlovsky, Cameron Park; Michael K. Wong, Sacramento, both of Calif.

[73] Assignee: Aerojet-General Corporation, Rancho Cordova, Calif.

[21] Appl. No.: 858,838

[22] Filed: Mar. 27, 1992

[51] Int. Cl.$^5$ ............................................. C06B 23/00
[52] U.S. Cl. ............................. 179/109.6; 149/124; 588/202
[58] Field of Search ............................. 149/109.6, 124; 588/202

[56] References Cited

U.S. PATENT DOCUMENTS

| | | | |
|---|---|---|---|
| 3,644,131 | 2/1972 | Gotshall | 106/307 |
| 3,909,497 | 9/1975 | Hendry et al. | 149/124 |
| 3,984,090 | 10/1976 | Swartz | 266/227 |
| 4,030,984 | 6/1977 | Chambers | 201/25 |
| 4,057,442 | 11/1977 | Shaw et al. | 149/124 |
| 4,098,627 | 7/1978 | Tompa | 149/109.6 |
| 4,235,676 | 11/1980 | Chambers | 202/118 |
| 4,333,737 | 6/1982 | Montgomery | 23/297 |
| 4,389,265 | 6/1983 | Tompa et al. | 149/124 |
| 4,474,629 | 10/1984 | York et al. | 149/109.6 |
| 4,718,955 | 1/1988 | Raisor | 149/124 |
| 4,758,387 | 7/1988 | Sayles | 149/109.6 |
| 4,854,982 | 8/1989 | Melvin et al. | 149/109.6 |

*Primary Examiner*—Edward A. Miller
*Attorney, Agent, or Firm*—Townsend and Townsend

[57] ABSTRACT

Waste energetic compositions such as solid rocket propellant are treated to reclaim aluminum particles in a form in which they can be reused for the same purpose and to convert the hydrocarbon values of the binder to a useful oil product, by leaching out oxidizer, and heating the aluminum-filled binder in a non-oxidizing atmosphere. The resulting pyrolysis causes the evolution of the oil components as a vapor which is removed, condensed and collected for use as an oil having properties similar to those of diesel oil, leaving as a residue the aluminum particles in the same form in which they were used in the original preparation of the composition now being treated as waste.

14 Claims, No Drawings

RECOVERY OF ALUMINUM AND HYDROCARBON VALUES FROM COMPOSITE ENERGETIC COMPOSITIONS

This invention lies in the field of solid rocket propellants and related compositions, and relates to methods for the disposal of waste compositions of this nature and the reclamation of useful materials.

BACKGROUND OF THE INVENTION

Energetic compositions such as those used as explosives and propellants present a well-recognized problem when it becomes necessary to dispose of such materials as waste. Solid rocket propellants are a prominent example, and a common instance in which the disposal problem arises is the regraining of rocket motors for reuse. This is one of numerous situations in which the propellant compositions used as rocket motor grain, and similar materials, must be disposed of in an acceptable manner. For environmental considerations, such methods as open-pit burning are not acceptable. Furthermore, if waste compositions of this nature are to be stored and handled, a serious risk of initiation from external influences such as an inadvertent impact or an accidental discharge is present. Clearly there is a need for safe and environmentally acceptable methods of disposing of waste rocket propellants and similar compositions.

In addition, the recycling of materials or the reclamation of value and use from them in one form or another is always a desirable goal. This is true of all components of energetic compositions, both organic and inorganic. Aluminum powder, a component widely used in these compositions, offers a particularly significant cost benefit when recycled. Recycling, for example, avoids the need for the large amounts of electrical energy used in the manufacture of aluminum from ore. Furthermore, aluminum is particularly expensive when manufactured or purchased in the small particle size required for energetic compositions.

SUMMARY OF THE INVENTION

It has now been discovered that waste solid rocket propellants and similar compositions can be treated to reclaim the aluminum in the same particulate form in which it was present in the original composition, while simultaneously recovering the value of the organic content in the form of an oil with properties and uses similar to those of diesel fuel. Compositions of this nature generally comprise aluminum particles, an oxidizer and a polymeric binder. The treatment process includes removal of the oxidizer, followed by heating of the remaining aluminum-filled binder in a non-oxidizing atmosphere to effect pyrolysis of the binder. The pyrolysis products are removed in vapor form, then condensed to a liquid oil. The composition of the oil will vary depending on the binder, but is generally a mixture of aliphatic, aromatic and olefinic hydrocarbons.

The heating is done under conditions which do not change the physical form of the aluminum, i.e., at a temperature at which the aluminum does not melt or sinter. In addition, the composition after extraction of the oxidizer is preferably dry when heated, any water originally present in the composition or used in the extraction of the oxidizer having been removed.

Included among the advantages of the present invention are that it avoids the formation of carbonaceous residue and prevents aluminum oxidation and melting, thereby permitting the recovery of high purity aluminum with unchanged particle size and shape, while extracting hydrocarbon values in the form of a liquid mixture having the properties of a useful fuel. Other advantages, features and objects of the invention will become apparent from the description which follows.

DETAILED DESCRIPTION OF THE INVENTION AND PREFERRED EMBODIMENTS

While the following discussion addresses solid rocket propellants in detail, the present invention applies to energetic compositions in general which contain aluminum particles, a binder and an oxidizer.

The specific binder in the composition is not critical and may vary. It may, for example, be any of the wide variety of polymeric binders used in solid rocket propellants, used either individually or in combination. Examples are polybutadienes such as hydroxyl-terminated polybutadiene (HTPB) and carboxyl-terminated polybutadiene (CTPB), acrylic acid/acrylonitrile/butadiene terpolymer (PBAN), and epoxy resins. Among these examples, those in particularly prominent use are HTPB, CTPB and PBAN.

Likewise, the specific oxidizer is not critical and may vary widely. Examples here as well include any of the wide variety used in solid rocket propellants, either alone or in combination. These include ammonium perchlorate (AP), ammonium nitrate (AN), cyclotrimethylene trinitramine (RDX), cyclotetramethylene tetranitramine (HMX), and nitroglycerin (NG). Of these, ammonium perchlorate is a prominent example.

The composition will also often contain additives in minor amounts, such as cure promoters, stabilizers, burning rate accelerators, thixotropic control agents, or modifiers of the polymer, as well as combinations of such materials. The selection and amounts of these additives will vary depending on the particular binder used, and the source of the composition. Essentially any of these materials may be included in the composition without substantial detriment to the process of the invention.

The aluminum particle size may vary as well, but will generally fall within the range of about 5 microns to about 60 microns.

The relative amounts of components in the composition will vary as they do in the industry and as disclosed in the literature. These variations and the range of proportions are generally known among those skilled in the art. The effect of these variations on the process of the present invention will be differences in the amount of product oil relative to the composition as it exists prior to pyrolysis, and in the identity and proportions of the components of the product oil. Regardless of the actual proportions and nature of the composition ingredients, however, the aluminum is recovered in essentially the same form in which it was first used, and a useful product oil mixture is achieved in the condensate.

The oxidizer, in accordance with the process of the invention, is removed from the composition, or at least reduced in concentration to a sufficient degree, to eliminate its effect as a potential oxidant of the aluminum and of the hydrocarbon values of the binder. This, plus the use of a non-oxidizing atmosphere for the heating to follow, prevent the conversion of the aluminum particles to alumina, and further prevent the conversion of the binder to non-condensible vapors or low-boiling species.

Removal of the oxidizer may be achieved by conventional means such as solvent extraction, physical means of separation, and any other means which will remove most, and preferably all, of the oxidizer from the composition. Solvent extraction is generally the most convenient and expedient means, the choice of solvent depending on the solubility properties of the oxidizer relative to those of the binder. For oxidizers which are at least partially water-soluble, water is a preferred solvent due to its safety, ease of use, and low cost. Ammonium perchlorate, for example, may be extracted with water, as well as with aqueous ammonium hydroxide and liquid ammonia.

Water is particularly convenient since it may also be used as a high pressure jet to remove the composition from a rocket motor as the first step in preparing the composition for treatment and conversion according to the process of this invention. This application of high-pressure water to the rocket motor in this manner to remove the propellant grain is known in the industry as the hydromining or "hog-out" of the propellant, and this procedure itself causes extraction of a portion of the oxidizer. After hog-out, the propellant is macerated, then further leached with water to remove any remaining oxidizer.

Small amounts of oxidizer may remain in the composition without serious detriment to the reclamation of the aluminum and the recovery of a useful oil mixture. In general, however, best results will be obtained when the oxidizer is reduced to less than about 2% by weight, and preferably less than about 0.5% by weight.

To improve efficiency in the pyrolysis stage, the oxidizer-free composition may be dried before pyrolysis. Drying may be achieved by any conventional means. A stream of heated inert gas is a convenient means, particularly in view of the use of inert gas as an atmosphere for the pyrolysis stage.

It is also preferred that the composition be chopped, shredded, ground, or otherwise reduced to a small particle size, to achieve uniform and rapid heat penetration. This as well may be accomplished by conventional means and equipment. Particles less than one inch in length, preferably less than one-quarter inch in length, will generally provide the best results.

The pyrolysis may be performed at any temperature which will effect decomposition of the binder without melting the aluminum or causing any substantial changes to its physical form. Best results will generally be achieved at a temperature ranging from about 350° C. (662° F.) to about 600° C. (1112° F.), preferably from about 450° C. (842° F.) to about 550° C. (1022° F.).

Pyrolysis is conducted in an inert atmosphere, preferably under an inert gas, such as for example nitrogen, helium or argon. Small amounts of oxygen will be tolerated. The discovery of the present invention, however, is that useful products, both the reclaimed aluminum in a substantially unchanged form and the product oil, may be obtained without oxidation. In most systems, the benefits of the invention will be seen with oxygen levels of less than about 2.0% by volume, and preferably less than about 0.5% by volume, in the atmosphere. The inert gas may be used as a means of removing the gases evolving from the aluminum-filled binder. This may be accomplished by passing the gas over the heated binder to sweep the evolving gases into a condenser and collection vessel. Additional and equivalent means of achieving the same effect will be readily apparent to those skilled in the art.

The gases evolved by the pyrolysis are condensed and collected by conventional means such as conventional heat exchange units with coils of circulating coolant or other forms of conventional liquid traps which separate the product oil from the inert gas as well as any non-condensible gases which are evolved in the pyrolysis. These non-condensibles may include low molecular weight hydrocarbons such as ethylene, ethane, methane, which are readily collected or disposed of by conventional means.

The purity of the aluminum resulting from the pyrolysis may be increased if desired or necessary by heating the aluminum in air at any temperature which is sufficient to oxidize any carbon which may have deposited on the aluminum. Appropriate temperatures will be readily apparent to those skilled in the art, but will in most cases range from about 500° C. to about 550° C.

The following example is offered strictly for purposes of illustration, and is intended neither to limit nor to define the invention in any manner.

EXAMPLE

To simulate a solid rocket propellant composition from which the oxidizer had been removed, a composition was prepared by combining the following ingredients:

| Component | Weight % |
|---|---|
| PBAN (equivalent weight 1,567) | 41.17% |
| Epoxy DER 331 (equivalent weight 187) | 5.50% |
| Aluminum Powder (particle size 45 microns) | 53.33% |

The composition was cut into 3 mm cubes, and a ½-gallon stainless steel container with gas inlet and outlet ports was charged with 1014 g of the cubed composition. The container was placed inside a furnace, with the inlet port was connected to a nitrogen gas supply, and the outlet port connected to ¾-inch stainless steel tubing wrapped with heating tape. The discharge end of the wrapped tubing was connected to a collection vessel immersed in an ice-water coolant bath to condense the vapors and trap the condensate, the vessel containing a vent port for the escape of non-condensible gases.

The furnace was heated to 525° C. and the heating tape to 200° C., with nitrogen gas flowing through the furnace and collection vessel. After rising to temperature over thirty minutes, the furnace was maintained at that temperature while visible fumes were detected in the furnace. Fumes were no longer visible after 42 minutes at 525° C., although heating was continued for a total of 2.5 hours at 525° C.

At the conclusion of the heating, the residue in the furnace container was cooled and recovered, as was the condensate in the collection vessel. The furnace residue removed from the pyrolytic vessel constituted 490 g of aluminum powder, analyzed by eudiometric analysis for aluminum content, which was 94.8% by weight. By observation, the particle size was the same as that of the particles used in preparing the composition prior to pyrolysis. The purity of the aluminum was increased to 98.3% by heating the aluminum in air at 525° C. to burn off the carbon residue which resulted from coking. This compares with the 99.5% purity of the aluminum used in the formation of the propellant. The condensate was a clear oil weighing 350 g, containing 77% aliphatic hydrocarbons, 16% aromatic hydrocarbons, 6% olefinic hydrocarbons, and an amine and trace amounts of nitriles, as determined by infrared analysis. The aliphatic, aromatic and olefinic contents were confirmed by proton NMR and carbon NMR.

The foregoing is offered primarily for purposes of illustration. It will be readily apparent to those skilled in the art that the operating conditions, materials, procedural steps and other parameters of the process of the invention described herein may be further modified or substituted in various ways without departing from the spirit and scope of the invention.

What is claimed is:

1. A process for the recovery of useful materials from a solid composite propellant composition comprising a polymeric binder, an oxidizer and aluminum particles, said process comprising:
   (a) removing oxidizer from said composition to achieve a substantially oxidizer-free composition;
   (b) heating said substantially oxidizer-free composition in the substantial absence of oxygen to pyrolyze said polymeric binder to vaporized oils, leaving said aluminum particles as a residue; and
   (c) condensing at least a portion of said vaporized oils as a liquid oil, and separately recovering said liquid oil and said aluminum particles.

2. A process in accordance with claim 1 in which step (b) comprises heating said substantially oxidizer-free composition at a temperature of from about 350° C. to about 600° C.

3. A process in accordance with claim 1 in which step (b) comprises heating said substantially oxidizer-free composition at a temperature of from about 450° C. to about 550° C.

4. A process in accordance with claim 1 in which said substantially oxidizer-free composition contains at most about 2% oxidizer by weight.

5. A process in accordance with claim 1 in which said substantially oxidizer-free composition contains at most about 0.5% oxidizer by weight.

6. A process in accordance with claim 1 in which step (b) comprises heating said substantially oxidizer-free composition in an atmosphere containing at most about 2% oxygen by volume.

7. A process in accordance with claim 1 in which step (b) comprises heating said substantially oxidizer-free composition in an atmosphere containing at most about 0.5% oxygen by volume at approximately atmospheric pressure.

8. A process in accordance with claim 1 in which step (a) comprises leaching said oxidizer from said composition with a solvent.

9. A process in accordance with claim 1 in which said oxidizer is water-soluble and step (a) comprises leaching said oxidizer from said composition with water.

10. A process in accordance with claim 1 in which said oxidizer is a member selected from the group consisting of ammonium perchlorate, ammonium nitrate, cyclotrimethylene trinitramine, cyclotetramethylene tetranitramine, and nitroglycerin, and step (a) comprises leaching said oxidizer from said composition with a solvent.

11. A process in accordance with claim 1 in which said oxidizer is ammonium perchlorate, and step (a) comprises leaching said oxidizer from said composition with a member selected from the group consisting of water, ammonium hydroxide and liquified ammonia.

12. A process in accordance with claim 1 in which said oxidizer is ammonium perchlorate, and step (a) comprises leaching said oxidizer from said composition with water.

13. A process in accordance with claim 1 in which said polymeric binder is a member selected from the group consisting of hydroxyl-terminated polybutadiene, carboxyl-terminated polybutadiene, acrylic acid/acrylonitrile/butadiene terpolymer, and epoxy resins; and step (b) comprises heating said substantially oxidizer-free composition at a temperature of from about 350° C. to about 600° C.

14. A process in accordance with claim 1 in which said polymeric binder is a member selected from the group consisting of hydroxyl-terminated polybutadiene, carboxyl-terminated polybutadiene, and acrylic acid/acrylonitrile/butadiene terpolymer; and step (b) comprises heating said substantially oxidizer-free composition at a temperature of from about 350° C. to about 600° C.

* * * * *